Oct. 29, 1935.  H. BOGATY  2,019,389
CONVEYER
Filed Jan. 12, 1933  2 Sheets-Sheet 1
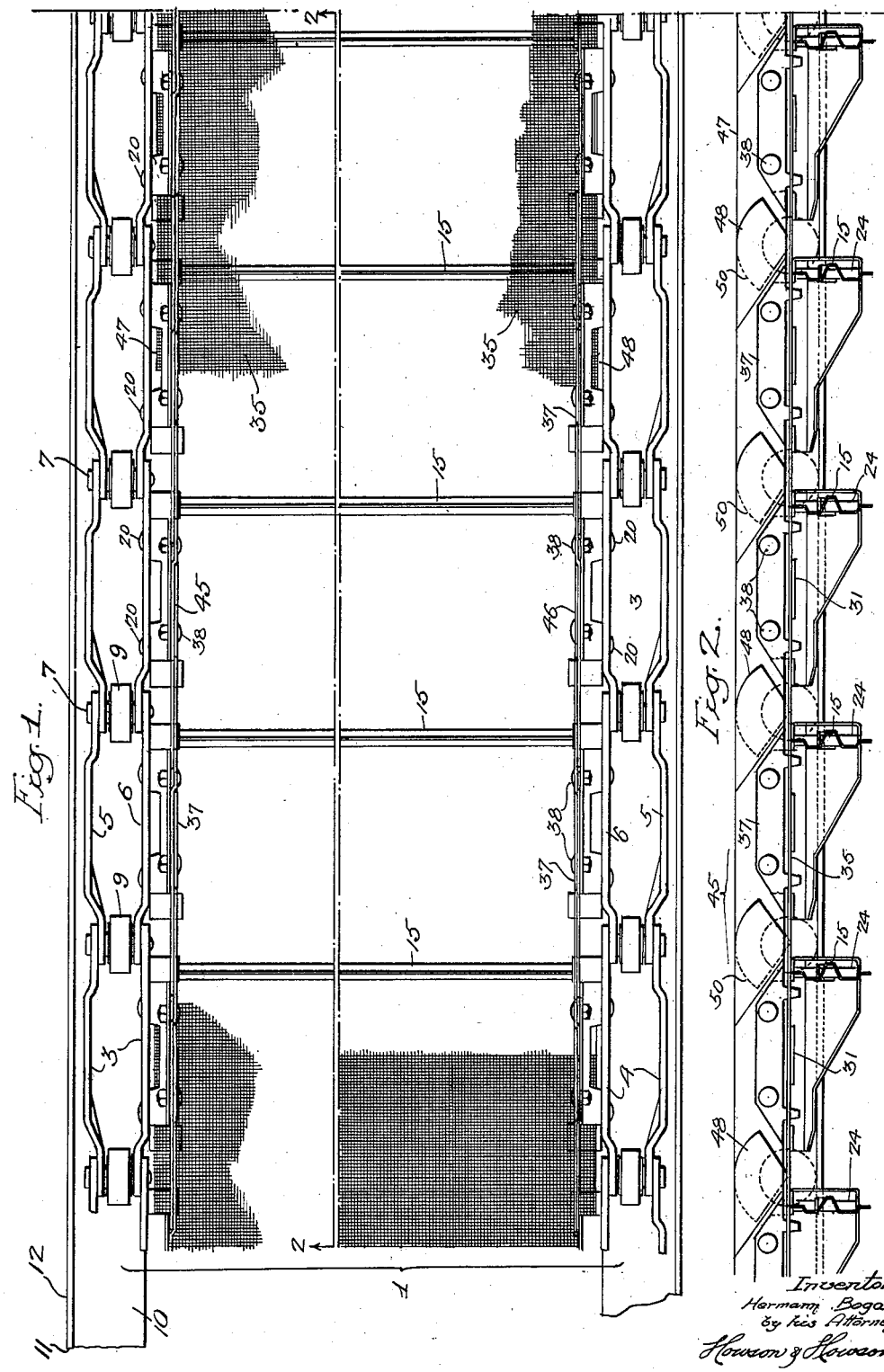
Inventor:
Hermann Bogaty
by his Attorneys
Howson & Howson Oct. 29, 1935.  H. BOGATY  2,019,389
CONVEYER
Filed Jan. 12, 1933   2 Sheets-Sheet 2
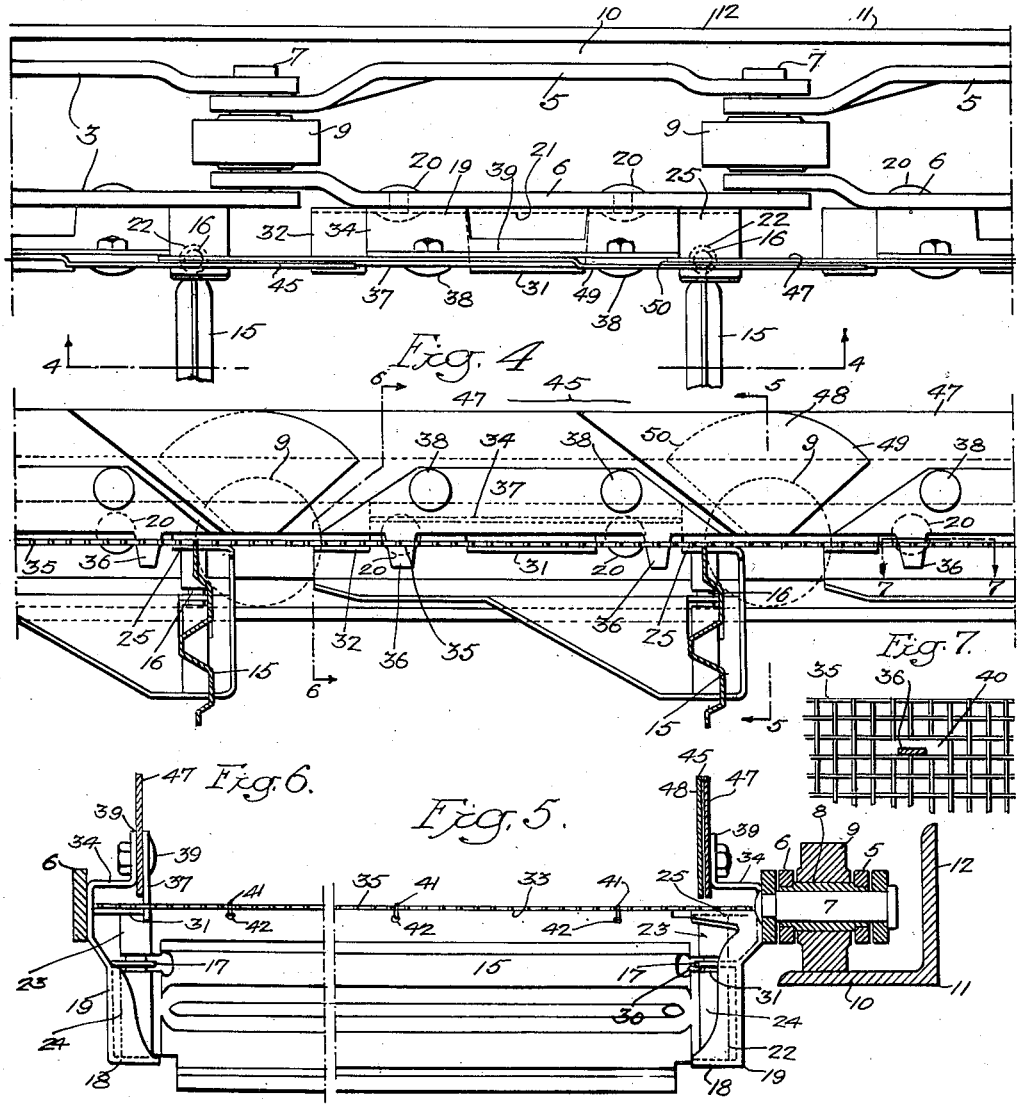
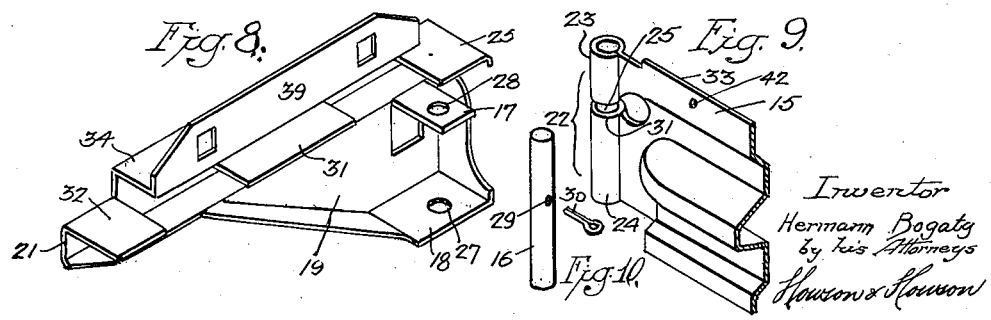

Patented Oct. 29, 1935

2,019,389

UNITED STATES PATENT OFFICE 2,019,389

CONVEYER

Hermann Bogaty, Philadelphia, Pa., assignor to Proctor & Schwartz, Incorporated, Philadelphia, Pa., a corporation of Pennsylvania Application January 12, 1933, Serial No. 651,433

9 Claims. (Cl. 198—194)

This invention relates to conveyers, and particularly to the type wherein a pair of side chains are maintained in laterally spaced relation to each other by transversely extending girts which are arranged in spaced relation to each other longitudinally of the conveyer and rigidly connected at their opposite ends to corresponding links of the side chains respectively; and wherein the girts function as supports for the flooring of the conveyor on which the material transported by the conveyer is carried. This construction provides a longitudinally movable platform which is flexible in a direction perpendicular to the plane of the conveyer but, due to the rigid connections between the side chains and the girts, flexibility other than that noted is limited to the inherent resiliency of the materials of which the elements of the conveyer are composed, while intentional relative movement between the elements other than that providing the perpendicular flexibility of the conveyer is eliminated.

Theoretically a conveyer of the type noted should travel in a straight line, with the side chains, intermediate the sprockets or guides around which they pass at the opposite ends of any single rectilinear run of the conveyer, running in a straight line between the said sprockets.

In practice conveyers of this type at times tend to move bodily to one side or the other, causing the side chains to rub against the guide rails and thereby causing considerable wear on the outer sides of the links of the chain.

The applicant has discovered that by constructing the conveyer in such a manner as will permit a relative longitudinal movement between the two side chains, within the plane of the conveyer, during movement of the conveyer as a unit in a longitudinal direction, the tendency of the conveyer to travel or move laterally is avoided and the wear on the sides of the chain links is thereby eliminated, consequently prolonging the useful life of the conveyer.

The construction of a conveyer according to the principles of the present invention will be fully disclosed hereinafter, reference being had to the accompanying drawings; of which:

Fig. 1 is a fragmentary plan view illustrating a portion of a horizontal run of the conveyer;

Fig. 2 is a sectional elevation taken on the line 2—2, Fig. 1;

Fig. 3 is a fragmentary plan view, drawn to an enlarged scale, showing a portion of one of the side chains and the girts flexibly connected thereto;

Fig. 4 is a sectional elevation taken on the line 4—4, Fig. 3;

Fig. 5 is a transverse sectional elevation taken on the line 5—5, Fig. 4;

Fig. 6 is a transverse sectional elevation taken on the line 6—6, Fig. 4;

Fig. 7 is a fragmentary sectional plan view taken on the line 7—7, Fig. 4; and

Figs. 8, 9 and 10 respectively illustrate, in perspective, the construction of one form of flexible connection between the side chains and the girts.

The conveyer unit 1, illustrated in Figs. 1 and 2, comprises side chains 3 and 4 respectively, each of which consists of outer side links 5 and inner side links 6. The successive side links are pivotally connected to permit flexibility of the conveyer unit in a direction substantially perpendicular to the plane of the conveyer unit 1, by pintles 7, 7. Surrounding each of the pintles 7 is a bushing 8 which is secured at its opposite ends respectively in each pair of side links 5 and 6 and which constitute one of the link units of the chain.

Rotatably mounted on the bushing 8 is a roller 9 which is adapted to ride on a horizontal flange 10 of a supporting angle bar 11, the vertical flange 12 of which, in the present instance, constitutes the guide rail which normally is provided to limit the lateral movement of the conveyer, as above described, and which in conveyers of the laterally rigid type rubs against the side links of the chains, causing the wear thereon under the conditions above noted.

Extending transversely of the conveyer unit 1, in laterally spaced relation longitudinally thereof, are the girts 15, 15 which normally are rigidly connected at their opposite ends to the side chains 3 and 4 respectively.

In order to provide for relative longitudinal movement between the side chains 3 and 4, during longitudinal movement of the conveyer 1 as a unit, the girts 15, 15, in the present instance, are pivotally connected at their opposite ends respectively to the side chains 3 and 4, by means of pivot pins 16, 16, the axes of which extend substantially perpendicular to the plane of the conveyer unit 1.

In the present instance the pivot pins 16, 16 are each mounted in lugs or ears 17 and 18 which project laterally from each of the side chains 3 and 4. In the present instance, the lugs 17 and 18 are formed as part of a bracket 19 which is composed of relatively heavy sheet metal and rigidly secured to the inner links 6 of the side chains 3 and 4 respectively, by rivets 20, 20, said rivets passing through the base 21 of each bracket 19 and the link 6 to which the bracket is secured.

In the present instance, each of the girts 15 is composed of a metal stamping at each end of which is formed a cylindrical head 22 comprising an upper bearing 23 and a lower bearing 24. Between the upper and lower bearings 23 and 24 is an inwardly extending slot 25 into which projects the lug 17 of the bracket 19.

The bearing 24, when the girt and bracket are assembled, is disposed between the lower side of the lug or ear 17 of the bracket 19 and the upper surface of the lug 18 of the said bracket, while the bearing 23 is disposed between the upper surface of the ear 17 and the lower surface of a cover lug 25, which projects from the base 21 of the bracket outwardly over the pivotal connection formed between the bracket 19 and the girt 15 by the pin 16.

In assembling the girt and the bracket, one end of the girt is placed in the bracket in the relation thereto as above noted and the pivot pin 16 is then inserted upwardly through an opening 27 formed in the lower lug 18 and passed upwardly through the lower bearing 24 of the girt 15, thence through an opening 28 formed in the intermediate ear or lug 17 and into the upper bearing 23 of the girt.

The pivoted pin 16 is provided with a transversely extending opening 29 for the reception of a cotter pin 30 which is inserted in and passed through the opening 29 between the lower surface of the ear 17 and the upper edge 31 of the lower bearing 24 of the girt 15, whereby the pivot pin 16 is secured in position and the girt thereby permanently but flexibly connected to the bracket 19, which in turn is permanently and rigidly connected to the side link 6 by the rivets 20, 20 in the manner above noted.

The upper surface of the cover plate 25 of the bracket 19 is disposed in horizontal alignment with an intermediate laterally extending ear or lug 31, pressed from the metal of which the bracket 19 is composed, and a second laterally extending lug or ear 32 which is also pressed from the metal of the bracket 19.

The ears 25, 31 and 32 constitute edge supports for the flooring 35 of the conveyer, which rests on the upper surfaces of said edge-supporting lugs and on the upper edges 33 of the girts 15, whereby the said flooring, which may consist of woven wire mesh or perforated sheet metal having sufficient flexibility to flex in a direction perpendicular to the plane of the flooring as the conveyer 1 passes around suitable sprockets or guides in the course of its travel, is supported throughout the conveyer.

Movement of the flooring 35 in a direction perpendicular to its general plane is limited relative to the side chains by an overhanging horizontal flange 34 forming part of the bracket 19, said flange being bent from and substantially at right angles to the base 21 of the bracket, said flange 34 extending outwardly from the base 21 over and in vertically spaced relation to the upper surfaces of the edge supports 25, 31 and 32.

Longitudinal movement of the flooring 35 with the side chains 3 and 4, as the conveyer 1 moves longitudinally as a unit, is accomplished by means of depending lugs or projections 36, 36 forming part of, and depending from the lower edge of, a plate 37 which is secured by bolts or rivets 38, 38 to a vertical flange 39 formed at the outer edge of and projecting substantially at right angles to the laterally extending flange 34 of the bracket 19.

The lugs 36 each extend downwardly from the lower edge plate 37, which is disposed adjacent the overhanging flange 34 of the bracket 19, to a position below the plane of the edge supports 25, 31 and 32, through elongated openings 40, 40 formed in the flooring 35 adjacent the opposite edges thereof, as illustrated in Fig. 7, in substantially equidistant relation relative to each other longitudinally of the conveyer.

If desired, the flooring 35 may also be flexibly connected to the girts 15 by means of wires or other fastenings 41, 41 passing through openings 42, 42 formed in the girts 15, 15 adjacent the upper carrying edges 33 thereof, the said connecting means 41, 41 being secured to the flooring 35 in any suitable manner that will permit a certain amount of relative movement between the girts 15 and the flooring 35 in a direction longitudinally of the conveyer.

With the construction noted, the side chains 3 and 4 are permitted to have relative movement with respect to each other in a direction longitudinally of the conveyer during longitudinal movement of the conveyer as a unit, whereby the girts 15, 15 may assume angular positions relative to the direction of movement of the conveyer, as a result of the pivotal connections afforded by the pivot pin 16, 16 at the opposite ends of each girt, which permanently, but flexibly, connect the girts to the side chains 3 and 4 respectively.

The construction of the conveyer, according to the present invention, in practice, has proven to be highly efficient in preventing lateral swerving of the conveyer from a direct straight line of longitudinal movement, whereby contact between the links of the side chains 3 and 4 and the side rails 12, 12 is avoided.

Conveyers of the general type herein disclosed are employed to a large extent for conveying loose stock, such for example as fibrous material, through a drier or other processing apparatus. In order to prevent the stock from falling from the side edges of the conveyer the conveyer of the present disclosure is provided with side guards 45 and 46 respectively, which are disposed adjacent to and inwardly from the side chains 3 and 4 and the side edges 47 and 48 of the flooring 35, respectively, and extend longitudinally of the conveyer.

The guards 45 and 46 each comprises a plate 47 which, in the present instance, is secured to the vertical flange 39 of the bracket 19, between the driving plate 37 and said flange 39, by the bolts 38 which secure the driving plate 37 to the flange 39. Each of the plates 47 is individual to a side link 6 of each chain 3 and 4, the ends of the plates 47, 47 of successive pivotally connected links 6, 6 overlapping each other as illustrated at 48, one end of each plate being offset laterally with respect to the plane of the next succeeding plate as indicated at 49, to provide working clearance for the end 50 of the said succeeding plate 47, to form a continuous guard along the entire edge of the conveyer.

Obviously, the edge supports 25, 31 and 32, the lugs 17 and 18 which form bearings for the girt pivots 16, and the flanges 34 and 39 which support the guards and the driving plates 37, may be formed as integral parts of the side links 6. However, as a matter of manufacturing convenience, these elements in the present instance are formed on and as part of the pressed sheet metal brackets 19, which may be conveniently secured to the side links 6 in such a rigid manner as to become as integral parts of the side links respectively.

I claim:

1. A conveyer comprising laterally spaced side chains, rigid transverse girts, relatively long pintles extending perpendicular to the plane of the conveyer, a pair of bearings carried by each side chain adjacent each girt, and a pair of bearings carried by each end of each girt, each pair of girt bearings embracing one of said pintles in alternating relation to a pair of the bearings on the chain.

2. A conveyer comprising laterally spaced side chains, rigid transverse girts, relatively long pintles extending perpendicular to the plane of the conveyer, brackets secured to the side chains, a pair of relatively spaced pintle bearings on each bracket, and a pair of relatively spaced bearings on each end of each girt for embracing the pintles in alternate relation to the bracket bearings.

3. A conveyer comprising laterally spaced side chains, rigid transverse girts, relatively long pintles extending perpendicular to the plane of the conveyer, brackets secured to the side chains, a pair of relatively spaced pintle bearings on each bracket, and an intermediate pintle bearing on each end of each girt for embracing the pintles between the spaced pair of bracket bearings.

4. A conveyer comprising laterally spaced side chains, rigid transverse girts, means extending perpendicular to the plane of the conveyer affording axially aligned pivotal connections between each girt and the side chains at a plurality of relatively spaced planes paralleling the plane of the conveyer, and a flooring supported by and connected to the side chains and the girts in a manner permitting relative movement between the side chains, the girts and the flooring longitudinally of the conveyer.

5. A conveyer comprising laterally spaced side chains, rigid transverse girts, means extending perpendicular to the plane of the conveyer affording axially aligned pivotal connections between each girt and the side chains at a plurality of relatively spaced planes paralleling the plane of the conveyer, and a flooring supported by the girts and connected to the side chains in a manner permitting relative movement between the side chains and the flooring longitudinally of the conveyer.

6. A conveyer comprising laterally spaced side chains, rigid transverse girts, means extending perpendicular to the plane of the conveyer affording axially aligned pivotal connections between each girt and the side chains at a plurality of relatively spaced planes paralleling the plane of the conveyer, and a flooring supported by and connected to each of said girts in a manner permitting relative movement between the side chains, the girts and the flooring longitudinally of the conveyer.

7. A conveyer comprising laterally spaced side chains, rigid transverse girts, brackets secured to the side chains, relatively long pintles extending perpendicular to the plane of the conveyer, bearings carried by the girts and the brackets respectively for embracing the pintles at planes spaced longitudinally of the pintles, a plurality of ears formed on and extending laterally from each bracket in a plane adjacent the plane of the upper edges of said girts, a flange formed on and extending laterally from the bracket in a plane parallel to and spaced above the plane of said ears, a perpendicular flange on the edge of the first said flange, a flooring supported on and by the upper edges of the girts, and projecting along its opposite side edges between the first said flange and said ears, and means secured to the perpendicular flange and extending into elongated openings in said flooring for attaching said flooring to said brackets and permitting relative longitudinal movement between the side chains and the flooring.

8. A conveyer comprising laterally spaced side chains, rigid transverse girts, relatively long pintles extending perpendicular to the plane of the conveyer, brackets secured to the side chains, a pair of relatively spaced pintle bearings on each bracket, a pair of relatively spaced bearings on each end of each girt for embracing the pintles in alternate relation to the bracket bearings, a plurality of ears formed on and extending laterally from each bracket in a plane adjacent the plane of the upper edges of said girts, a flange formed on and extending laterally from the bracket in a plane parallel to and spaced above the plane of said ears, a perpendicular flange on the edge of the first said flange, a flooring supported on and by the upper edges of the girts, and projecting along its opposite side edges between the first said flange and said ears, and means secured to the perpendicular flange and extending into elongated openings in said flooring for attaching said flooring to said brackets and permitting relative longitudinal movement between the side chains and the flooring.

9. A conveyer comprising laterally spaced side chains, rigid transverse girts, brackets secured to the side chains, relatively long pintles extending perpendicular to the plane of the conveyer, bearings carried by the girts and the brackets respectively for embracing the pintles at planes spaced longitudinally of the pintles, a plurality of ears formed on and extending laterally from each bracket in a plane adjacent the plane of the upper edges of said girts, a flange formed on and extending laterally from the bracket in a plane parallel to and spaced above the plane of said ears, a perpendicular flange on the edge of the first said flange, a flooring supported on and by the upper edges of the girts, and projecting along its opposite side edges between the first said flange and said ears, means secured to the perpendicular flange and extending into elongated openings in said flooring for attaching said flooring to said brackets and permitting relative longitudinal movement between the side chains and the flooring, and means for connecting said flooring to said girts intermediate said side chains in a manner permitting relative movement between the girts and the flooring in the plane of the conveyer.

HERMANN BOGATY.